US012537857B2

(12) United States Patent
Lu et al.

(10) Patent No.: US 12,537,857 B2
(45) Date of Patent: Jan. 27, 2026

(54) SECURITY CONTROLS ACROSS SaaS APPS

(71) Applicant: Palo Alto Networks, Inc., Santa Clara, CA (US)

(72) Inventors: Chienhua Lu, San Jose, CA (US); Nicolas Antonio Filip-Sanchez, San Jose, CA (US); Taylor Ettema, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 291 days.

(21) Appl. No.: 18/213,710

(22) Filed: Jun. 23, 2023

(65) Prior Publication Data

US 2024/0430303 A1 Dec. 26, 2024

(51) Int. Cl.
*H04L 9/40* (2022.01)
(52) U.S. Cl.
CPC .................... *H04L 63/20* (2013.01)
(58) Field of Classification Search
CPC ...................................... H04L 63/20
USPC ............................................. 726/1
See application file for complete search history.

(56) References Cited

U.S. PATENT DOCUMENTS

| | | | | |
|---|---|---|---|---|
| 9,608,810 B1 * | 3/2017 | Ghetti | ................ | H04L 63/0428 |
| 2016/0197962 A1 * | 7/2016 | Winn | ................ | H04L 63/0823 |
| | | | | 713/168 |

OTHER PUBLICATIONS

Almorsy et al, Collaboration-Based Cloud Computing Security Management Framework, In Proceedings of 2011 EEE International Conference on Cloud Computing (CLOUD 2011), Washington DC, USA on Jul. 4-Jul. 9, 2011, EEE.
Almorsy et al., TOSSMA: A Tenant-Oriented SaaS Security Management Architecture, In proceedings of 5th IEEE Conference on Cloud computing (Cloud 2012), Jun. 24-29, Waikiki, Hawaii, USA, IEEE 2012.
George et al., Securing Cloud Application Infrastructure: Understanding the Penetration Testing Challenges of IaaS, PaaS, and SaaS Environments, Partners Universal International Research Journal (PUIRJ), vol. 02 Issue: 01, Jan.-Mar. 2023.

* cited by examiner

*Primary Examiner* — Anthony D Brown
(74) *Attorney, Agent, or Firm* — Van Pelt, Yi & James LLP (57) ABSTRACT

Various techniques for security controls across SaaS apps are disclosed. In some embodiments, a system/method/computer program product for providing security controls across SaaS apps includes collecting configuration settings for each of a plurality of Software as a Service (SaaS) applications (apps) for a SaaS security service, wherein the configuration settings are related to security for one or more of the plurality of SaaS apps; grouping each of the configuration settings into one of a plurality of categories and one of a plurality of subcategories; and determining that a configuration setting associated with at least one of the plurality of SaaS apps is not in compliance with a rule of a security policy.

17 Claims, 8 Drawing Sheets

Activity > SaaS Security

SaaS Security
Manage your organization's shadow IT

- Discovered Apps
- Data Security
- Dashboard
- Applications

High — Apps require re-authentication after session expiration or logout to limit the ability of an attacker to gain entry using stolen credentials or session tokens.

Policy Information
You can mitigate the amount of damage an attacker can do with stolen session expiration based on things such as a user inactivity

Force logout on session timeout
- ○ Monitored ⓘ
- ○ Drift Prevention ⓘ
- Force logout on session timeout — 322
- ☐ More information from Application Site — 324

Current Value: True
Suggested Value: True

[ Remediate ]   [ Close ]

Settings (14)

| Application ↑ | Compliance Mapping | Setting Name ↕ | Remediation Type ⓘ↕ | Status |
|---|---|---|---|---|
| ⊚ Zoom-8-26-testsspm | | sign in again after a period of inactivity - web | System | Violati |
| ⊚ Zoom-8-26-testsspm | | sign in again after a period of inactivity-client | System | Violati |
| box box main | | Session Duration | Manual | Violati |
| salesforce 20220824200354 | | Force logout on session timeout | System | Passe |
| salesforce 20220824200354 | | Session Timeout | System | Passe |
| salesforce 20220824200354 | | Gmail integration users log in to Salesforce from Gmail each time their sessions expires. | Manual | NoVal |
| salesforce_test_1 | | Force logout on session timeout | System | Passe |

Policies By Status

48 Policies

| Policy Status ↕ | Policies |
|---|---|
| ⊗ Failed | Administrative |
| ⊗ Failed | Access policy |
| ⊗ Failed | Multi-Factor A |
| ⊗ Failed | High-security |
| ⊗ Failed | External acces |

Sidebar:
- Activity
- Dashboards
- SaaS Security
- Scheduled Reports
- Logs
- Log Viewer
- DLP Incidents
- Search [Beta]

SECURITY CONTROLS ACROSS SaaS APPS

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DlP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content not just ports, IP addresses, and packets using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Managing Security Controls for SaaS Apps

Security service providers offer various commercially available cloud-based security solutions including various firewall, VPN, and other security related services. For example, some security service providers offer various security solutions to facilitate security enforcement and security management of various Software as a Service (SaaS) solutions that are sanctioned/supported SaaS solutions for users of their enterprise customers (e.g., supported SaaS providers, such as Microsoft Office 365, Salesforce®, etc.).

However, typical enterprises consume up to hundreds of sanctioned SaaS apps, with each app bringing potentially hundreds of features and settings (e.g., a typical enterprise can consume tens to hundreds or more supported SaaS apps for their enterprise users, with each SaaS app including potentially hundreds of features and settings, many of which are related to security aspects for the SaaS apps, which impacts a security posture for the enterprise). As such, effectively and efficiently managing all these SaaS applications can be technically challenging as each one provides a unique console and set of security configurations, which can introduce new security blind spots or other security related issues (e.g., as the number of SaaS apps increases, there generally is no underlying framework that removes app-specific jargon and focuses on the security impact of each setting). Given the potentially thousands of settings to manage across such SaaS apps, enterprise administrator (admin) users (e.g., network/security/IT/InfoSec admins) also can receive a large number of incoming alerts (e.g., which can make security alert prioritization more difficult as important security alerts can get missed in the noise of too many alerts, etc.).

Another technical challenge for enterprise admins is not only protecting sensitive data against security issues but also retaining compliance and uniform policy enforcement across a potentially vast array of security settings associated with many different SaaS apps. Unfortunately, with limited resources, tools, and budgets, enterprise IT leaders are typically asked to do more with less. SaaS Security Posture Management (SSPM) is a type of commercially available security solution/product that aims to address various SaaS security issues by monitoring and evaluating the security configuration of each SaaS app. For example, an SSPM solution can connect to many different SaaS apps through a supported/public API(s) (e.g., which can be used to collect the status of the configurations for that SaaS app and provide alerting and remediation options to the enterprise customers).

However, there are several problems for existing SSPM approaches.

First, most of the existing security solutions (e.g., SaaS Security Posture Management (SSPM)) are evaluating security posture of each SaaS app independently or separately. As such, customers cannot quickly view and/or access configuration settings that are relevant to an overall security posture without spending time navigating through individual relevant configuration settings for each SaaS app (e.g., customer admins typically do not have a way of accessing a holistic overview of their security posture, because they are too busy looking at the individual settings of each SaaS app, which forces such customer admins to spend a significant amount of time and effort evaluating each SaaS app manually, such as checking a session timeout setting value(s)).

Second, as the number of SaaS apps increases for a given enterprise, checking security issues from each SaaS app becomes increasingly inefficient and ineffective (e.g., existing manual processes are inefficient). As such, existing processes across an ever increasing number of SaaS apps does not scale well for effective and efficient security controls for SaaS Apps for enterprises.

Third, existing SSPM approaches cannot provide a horizontal evaluation on important security vectors across all SaaS apps. For example, to check whether MFA is enabled, such enterprise customers would typically need to check each SaaS app one by one using existing SSPM approaches.

Thus, there is a need for enhanced security controls for managing SaaS apps.

Overview of Techniques for Security Controls Across SaaS Apps

Accordingly, new and improved techniques for providing security controls across Software as a Service (SaaS) applications (apps) are disclosed.

In some embodiments, a system/method/computer program product for providing security controls across SaaS apps includes collecting configuration settings for each of a plurality of Software as a Service (SaaS) applications (apps) for a SaaS security service, wherein the configuration settings are related to security for one or more of the plurality of SaaS apps; grouping each of the configuration settings into one of a plurality of categories and one of a plurality of subcategories; and determining that a configuration setting associated with at least one of the plurality of SaaS apps is not in compliance with a rule of a security policy.

For example, various security common controls are disclosed that can assist users (e.g., IT/network/security/InfoSec admins for an enterprise) to easily manage security postures across a large number of SaaS apps by categorizing security settings across SaaS apps into a predetermined set of categories (e.g., data security, identity and access management (IAM), app hardening, etc.). Moreover, each category can be further categorized into subcategories (e.g., sharing settings under data security, session management under IAM, etc.). As such, the disclosed techniques for security controls across SaaS apps facilitate organizing similar security related settings across multiple SaaS apps by mapping them to a fixed/predetermined framework of security categories and subcategories for more intuitive, efficient, and effective security posture management of such SaaS apps for the enterprise, such as will be further described below.

In an example implementation, the rule is associated with at least one of a plurality of rules of the security policy configured for security compliance for each of the plurality of subcategories. The plurality of SaaS apps is associated with an enterprise customer of the SaaS security service. The SaaS security service is implemented as a cloud-based security service. Also, a security platform (e.g., a virtual or container-based firewall and/or a Network Gateway Fire-Wall (NGFW)) can be configured to enforce the security policy.

In one embodiment, a system/method/computer program product for providing security controls across SaaS apps further includes automatically analyzing each of the configuration settings for each of the plurality of SaaS apps based on a plurality of rules of the security policy configured for security compliance for each of the plurality of subcategories.

In one embodiment, a system/method/computer program product for providing security controls across SaaS apps further includes generating an alert if a configuration change violates one or more of a plurality of rules of the security policy configured for security compliance for each of the plurality of subcategories.

In one embodiment, a system/method/computer program product for providing security controls across SaaS apps further includes performing drift protection for the configuration settings that are related to security for one or more of the plurality of SaaS apps based on a plurality of rules of the security policy configured for security compliance for each of the plurality of subcategories.

In one embodiment, a system/method/computer program product for providing security controls across SaaS apps further includes performing one-click remediation if a configuration change violates one or more of a plurality of rules of the security policy configured for security compliance for each of the plurality of subcategories.

In one embodiment, a system/method/computer program product for providing security controls across SaaS apps further includes providing an interface (e.g., a graphical user interface (GUI) or another form of user interface) for drilling down into a selected configuration setting for a selected SaaS app that includes associated user documentation for the configuration setting.

In one embodiment, a system/method/computer program product for providing security controls across SaaS apps further includes overriding a recommended (e.g., default) configuration for at least one of the settings based on a user selection.

In one embodiment, a system/method/computer program product for providing security controls across SaaS apps further includes reconfiguring a rule (e.g., a default rule) for a selected configuration setting (e.g., changing a default session timeout to force reauthentication from every 15 minutes to every 30 minutes).

In an example implementation, through a thorough analysis of each SaaS app's configurations, we observed that most of the SaaS security settings from the SaaS apps could be categorized into a set of distinct categories (e.g., data security, Identity & Access Management (IAM), etc.), and each category can be further categorized into a set of distinct subcategories (e.g., session management under IAM, etc.). Under these subcategories, we discovered that we can further organize related security settings across the SaaS apps and associate the related subcategorized security settings for more intuitive management across the SaaS apps. As an example, we can gather all session timeout related settings from all of the supported/sanctioned SaaS apps for a given customer, and associate them under one control (e.g., providing such common controls in an enhanced SSPM solution, such as will be further described below).

As such, by providing such common controls for providing security controls across SaaS apps, enterprise admin users can quickly access a horizontal view and compliant status for various security related issues/settings across all of the SaaS apps for the enterprise (e.g., the disclosed techniques for security controls for managing SaaS apps can be implemented in various security solutions, such as the commercially available solution from Palo Alto Networks, Inc., headquartered in Santa Clara, CA, for SaaS Security Posture Management (SSPM) to, for example, facilitate customers performing a horizontal evaluation on various important security vectors across all SaaS apps for the enterprise). Even with a large number of SaaS apps, enterprise customers can use the common controls to consistently monitor and adjust various important security settings/issues across their supported SaaS apps for their enterprise. Moreover, users can spend less time and effort by not having to check common/overlapping settings for each such SaaS app, and as a result, they can be more focused on dealing with the security posture issues for their enterprise.

For example, the disclosed techniques for providing security controls across SaaS apps can be implemented in a SaaS Security Posture Management (SSPM) solution that can automatically detect and remediate misconfigured settings (e.g., security related configuration settings) in sanctioned/supported SaaS applications for an enterprise through continuous monitoring. Specifically, the SSPM solution can be configured to identify misconfigurations using built-in best practices, to categorize misconfigurations by severity to help enterprise admins prioritize risks. The SSPM solution can also be configured to automatically generate misconfiguration alerts, including providing an ability to automatically remediate issues quickly across applications, such as by providing a one-click of a button for remediation or manually using straightforward instructions for enterprise admins. The SSPM solution can also be configured to lock a given configuration setting(s) for the enterprise SaaS apps so that, for example, an important security related configuration setting does not become a misconfiguration in the future (e.g., disabling/turning off MFA for SaaS apps, etc.).

In addition, the disclosed techniques for providing security controls across SaaS apps can facilitate users (e.g., network/security/IT/InfoSec admins, etc.) to quickly access a horizontal view from both a security and compliance perspective about the issues across all of their supported SaaS apps (e.g., to quickly determine how many SaaS apps do not have Multi-Factor Authentication (MFA) enabled/turned on, etc.).

Also, even with a large number of supported SaaS apps, the disclosed techniques for providing security controls across SaaS Apps can facilitate users accessing/monitoring/configuring various security settings/issues by using a fixed number of common controls.

Accordingly, various techniques for providing security controls across SaaS apps (e.g., for cloud-based security solutions) are disclosed as will now be described below.

System Embodiments for Security Controls Across SaaS Apps

Figure 1:
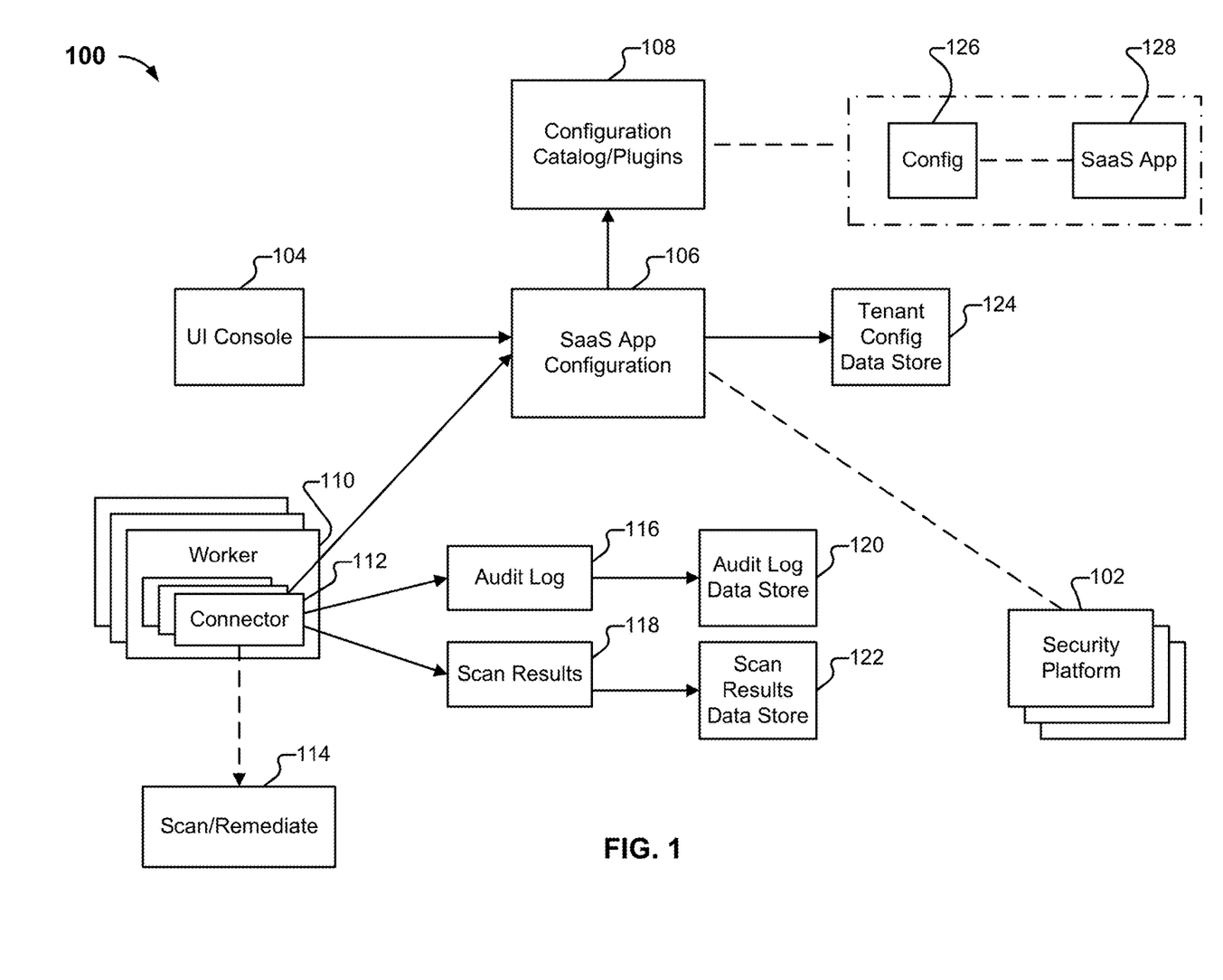
FIG. 1 is a system diagram overview of an example architecture for providing security controls across SaaS apps in accordance with some embodiments.

FIG. 1 is a system diagram overview of an example architecture for providing security controls across SaaS apps in accordance with some embodiments. Specifically, FIG. 1 illustrates an example architecture for a SaaS security service as shown at 100.

Referring to FIG. 1, SaaS security service architecture 100 includes a plurality of workers 110 that can each include a plurality of connectors 112. Connectors 112 of Workers 110 are in communications with a SaaS App Configuration component 106. SaaS App Configuration 106 is in communication with a Tenant Configuration (Config) Data Store 124 for securely storing SaaS App configurations for each supported/sanctioned SaaS App associated with each Tenant (e.g., each enterprise customer of the SaaS security service). SaaS App Configuration 106 is also in communication with a Configuration Catalog/Plugins component 108. Configuration Catalog/Plugins component 108 can be implemented using public and/or private APIs and/or plugin solutions for communicating with each of the supported SaaS Apps of the SaaS security service, to obtain configuration information for each SaaS app and for configuring the SaaS App as shown at 126 and 128 (e.g., in some implementations, such information can be collected via unpublished/private APIs and/or web scraping). SaaS App Configuration 106 is also in communication with a UI Console component 104 (e.g., implemented as a Graphical User Interface (GUI) and/or another form of UI) of the SaaS security service.

Connectors 112 of Workers 110 are also in communication with an Audit Log 116 that periodically or on demand performs an audit of the monitored SaaS Apps and stores the audited configuration information associated with the SaaS Apps in an Audit Log Data Store 120. Connectors 112 of Workers 110 are also in communication with Scan Results 118 and store the scanned configuration information associated with the SaaS Apps in a Scan Results Data Store 122. As shown at 114, Connectors 112 of Workers 110 can perform a scan/remediation action to determine whether or not a SaaS App for a given enterprise is in compliance with a SaaS App configuration policy (e.g., a security policy for SaaS Apps, which can be stored in Tenant Config Data Store 124). For example, the security policy for SaaS Apps for a given tenant can be enforced using a network gateway 102 (e.g., the security platform can be implemented using a firewall, NFGW, a virtual firewall, etc.) for the tenant.

For example, the above-described SaaS security service architecture 100 can provide security controls across SaaS apps by automatically collecting (e.g., periodically and/or on demand) configuration settings for each of a plurality of Software as a Service (Saas) applications (apps), each given tenant of the SaaS security service (e.g., the configuration settings are related to security for one or more of the plurality of SaaS apps). SaaS App Configuration component 106 is configured to automatically group each of the configuration settings into one of a plurality of categories and one of a plurality of subcategories using a predetermined schema, such as shown in Appendix-A, which provides an example schema (e.g., taxonomy) for a subset of such categories and sub-categories. SaaS security service 100 (e.g., using SaaS App Configuration 106 and a Worker 110 and Connector 112) is further configured to determine that a configuration setting associated with at least one of the plurality of SaaS apps is not in compliance with a rule of a security policy.

For example, various security common controls are disclosed that can assist users (e.g., IT/network/security/InfoSec admins for an enterprise) to easily manage security postures across a large number of SaaS apps by categorizing security settings across SaaS apps into a predetermined set of categories (e.g., data security, identity and access management (IAM), app hardening, etc.). Moreover, each category can be further categorized into subcategories (e.g., sharing settings under data security, session management under IAM, etc.). As such, the disclosed techniques for security controls across SaaS apps facilitate organizing similar security related settings across multiple SaaS apps by mapping them to a fixed/predetermined framework of security categories and subcategories for more intuitive, efficient, and effective security posture management of such SaaS apps for the enterprise, such as will be further described below.

In an example implementation, the rule is associated with at least one of a plurality of rules of the security policy configured for security compliance for each of the plurality of subcategories. The plurality of SaaS apps is associated with a tenant (e.g., an enterprise customer) of the SaaS security service.

In an example implementation, SaaS security service 100 is implemented as a cloud-based security service (e.g., executing on a cloud computing environment, such as using Amazon Web Services (AWS), Google Cloud, Microsoft Azure, and/or another cloud computing environment service). In another example implementation, SaaS security service 100 is implemented on-premises (on-prem) using a computing data center for a tenant (e.g., an enterprise customer and/or government entity that prefers to maintain all such data associated with their computing security and SaaS apps to be maintained on-prem). Also, a security platform (e.g., a virtual or container-based firewall and/or a Network Gateway FireWall (NGFW)) can be configured to enforce the security policy, such as described above.

In this example implementation, onboarding of SaaS apps for SaaS security service 100 includes connecting the enterprise's supported SaaS apps to the SSPM solution. For example, to detect posture risks on supported SaaS apps on the SSPM solution, the SaaS apps can be connected to SSPM by authenticating to each SaaS app using an administrator account (e.g., the specific privilege requirements can vary from SaaS app to SaaS app). After successfully authenticating each SaaS app, the SSPM solution receives a token from the cloud app for establishing and maintaining a secure connection. The SSPM solution then can directly connect to the application programming interface (API) for that cloud app, which enables the scanning of the configuration and related settings for the SaaS app, as well as continually monitoring changes to the configuration.

After onboarding each of the enterprise's supported SaaS apps to the SSPM solution, the SSPM solution can be used to automatically assess a security posture for such SaaS apps for the enterprise. For example, the SSPM solution can be configured to execute a scan that compares each of the SaaS app configuration settings against various SSPM built-in best/recommended security setting practices (e.g., IAM/Session Management configuration setting(s), such as values/ranges for associated timeout settings, etc.). Based on the scan results, SSPM can generate an alert(s) for policy (e.g., security policy) violations.

As an example, after onboarding of SaaS Apps for a given tenant, the above-described SaaS security service can be used to assess posture security for the SaaS apps for that enterprise customer. Specifically, the SaaS security service can be used to perform a scan where it compares the SaaS app configuration against built-in best practices (e.g., default recommended SaaS app configuration settings). Based on the scan results, the SaaS security service generates an alert and/or a report on policy violations.

Figure 3A:
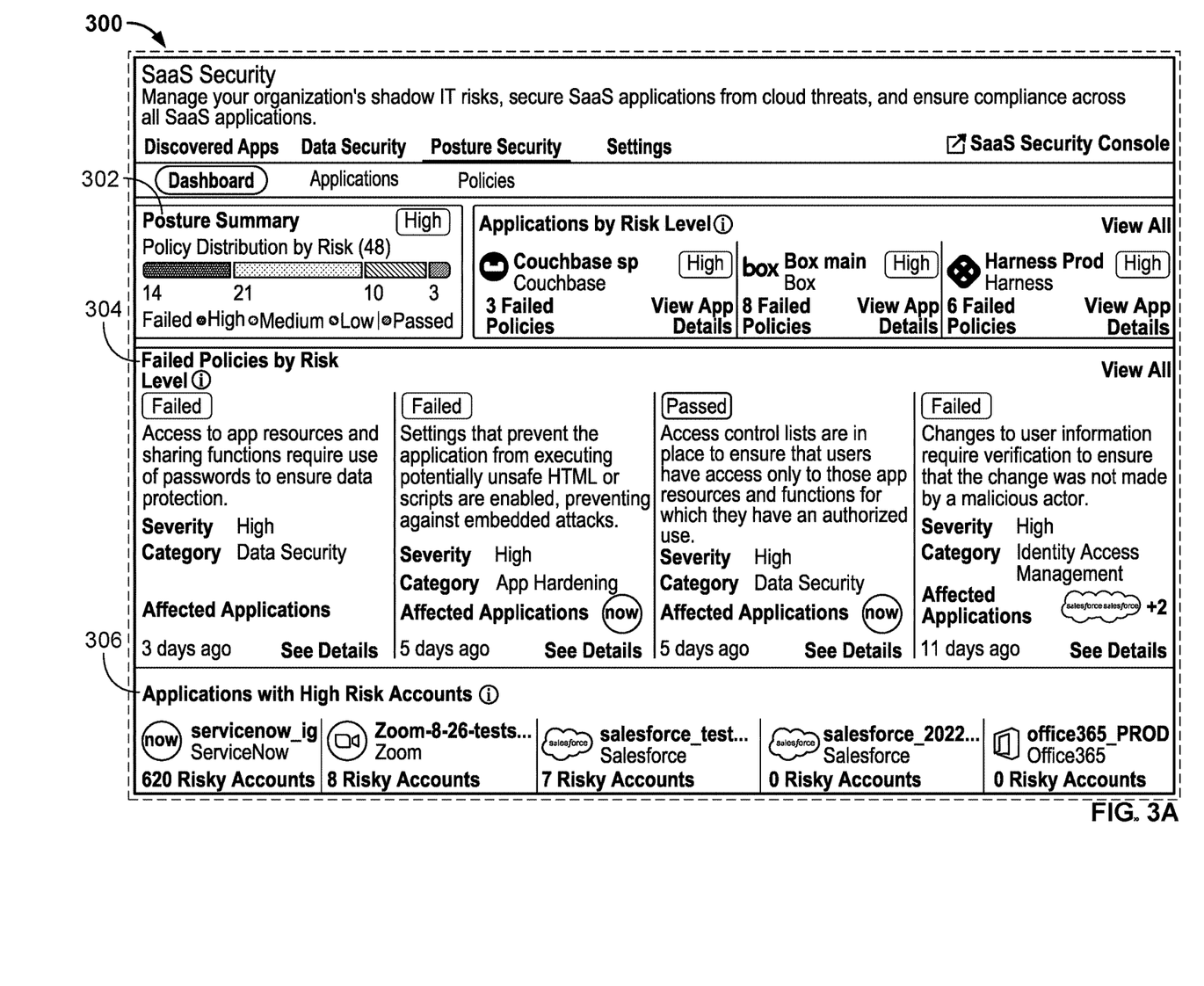
FIG. 3A is an example graphical user interface screen for the SaaS security service in accordance with some embodiments.

As another example, after onboarding of SaaS Apps for a given tenant, the above-described SaaS security service can be used to monitor posture security for the SaaS apps for that enterprise customer. Specifically, the SaaS security service can be used to monitor posture security for the SaaS app configuration settings for each of the onboarded SaaS apps for the enterprise customer. In an example implementation, the UI of the SaaS security service includes a dashboard that provides various at-a-glance metrics related to posture security across all of the sanctioned SaaS apps for the enterprise customer (e.g., such visibility can be divided into sections to facilitate understanding of threats of misconfigurations and risky accounts by SaaS app, so that an admin can take a responsive action to remediate/fix any failed SaaS app configuration settings/policies), such as shown in FIG. 3A as further described below.

Remediation of a policy violation can be performed using the disclosed SSPM solution. For example, a policy violation for a given setting can be manually selected by an enterprise admin user and a one-click remediation button can be clicked/selected to automatically remediate that configuration setting to change the associated SaaS app's security related settings to comply with an associated rule in the security policy.

Figure 2:
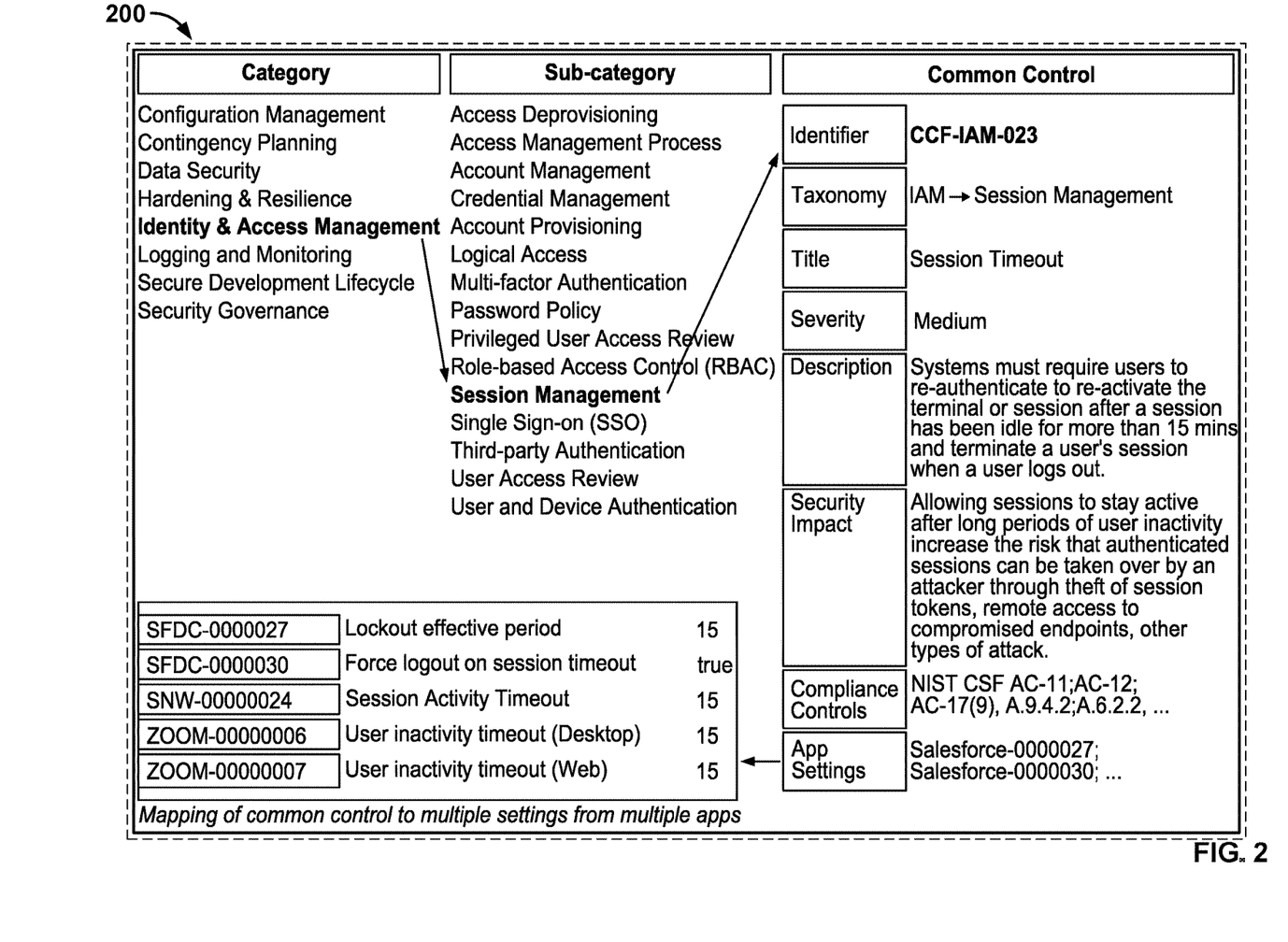
FIG. 2 is an example policy schema for providing security controls across SaaS apps in accordance with some embodiments.

FIG. 2 is an example policy schema for providing security controls across SaaS apps in accordance with some embodiments. As illustrated by the example policy schema at 200, a category for Identity & Access Management (IAM) is associated with a plurality of subcategories including a Session Management subcategory as shown, which is identified with a common control (e.g., identifier equals CCF-IAM-023 for a Session Timeout related IAM/Session Management configuration setting, which can be associated with various settings for each supported SaaS App as also shown).

As such, the disclosed techniques for providing security controls across SaaS apps can include a mapping of common controls to multiple security related configuration settings from multiple different SaaS apps. By providing the above-described common controls solution for security settings across multiple different SaaS apps for an enterprise, enterprise admin users can quickly access a horizontal view and compliant status about the issues across all of the SaaS apps for their enterprise. Even with a large number of SaaS apps, enterprise customers can more effectively and more efficiently determine the important security settings/issues by using the common controls. As such, enterprise admin users can spend less time on checking each SaaS app and can be more focused on dealing with the security posture issues for their enterprise.

FIG. 3A is an example graphical user interface screen for the SaaS security service in accordance with some embodiments. For example, after onboarding of SaaS Apps for a given tenant, the above-described SaaS security service can be used to monitor posture security for the SaaS apps for that enterprise customer. Specifically, the SaaS security service can be used to monitor posture security for the SaaS app configuration settings for each of the onboarded SaaS apps for the enterprise customer. In an example implementation, the UI of the SaaS security service includes a dashboard as shown at 300 that provides various at-a-glance metrics related to posture security across all of the sanctioned SaaS apps for the enterprise customer (e.g., such visibility can be divided into sections to facilitate understanding of threats of misconfigurations and risky accounts by SaaS app, so that an admin can take a responsive action to remediate/fix any failed SaaS app configuration settings/policies), such as shown in FIG. 3A as further described below.

In this example implementation, UI Console 104 of the SaaS security service includes a SaaS Security Posture Management (SSPM) Dashboard shown at 300 that provides at-a-glance metrics related to posture security across all sanctioned SaaS apps as shown at 302. Such visibility is divided into sections that help enterprise admin users to understand threats of misconfigurations and risky accounts by SaaS apps as shown at 306 so that they can take quick action to fix failed policies as shown at 304. Also, admins (e.g., InfoSec/IT/network/security admins) can use the SSPM interface to view policy violations by SaaS app or by policy type (e.g., and/or viewing all policy violations independent of a specific SaaS app(s)).

Figure 3B:
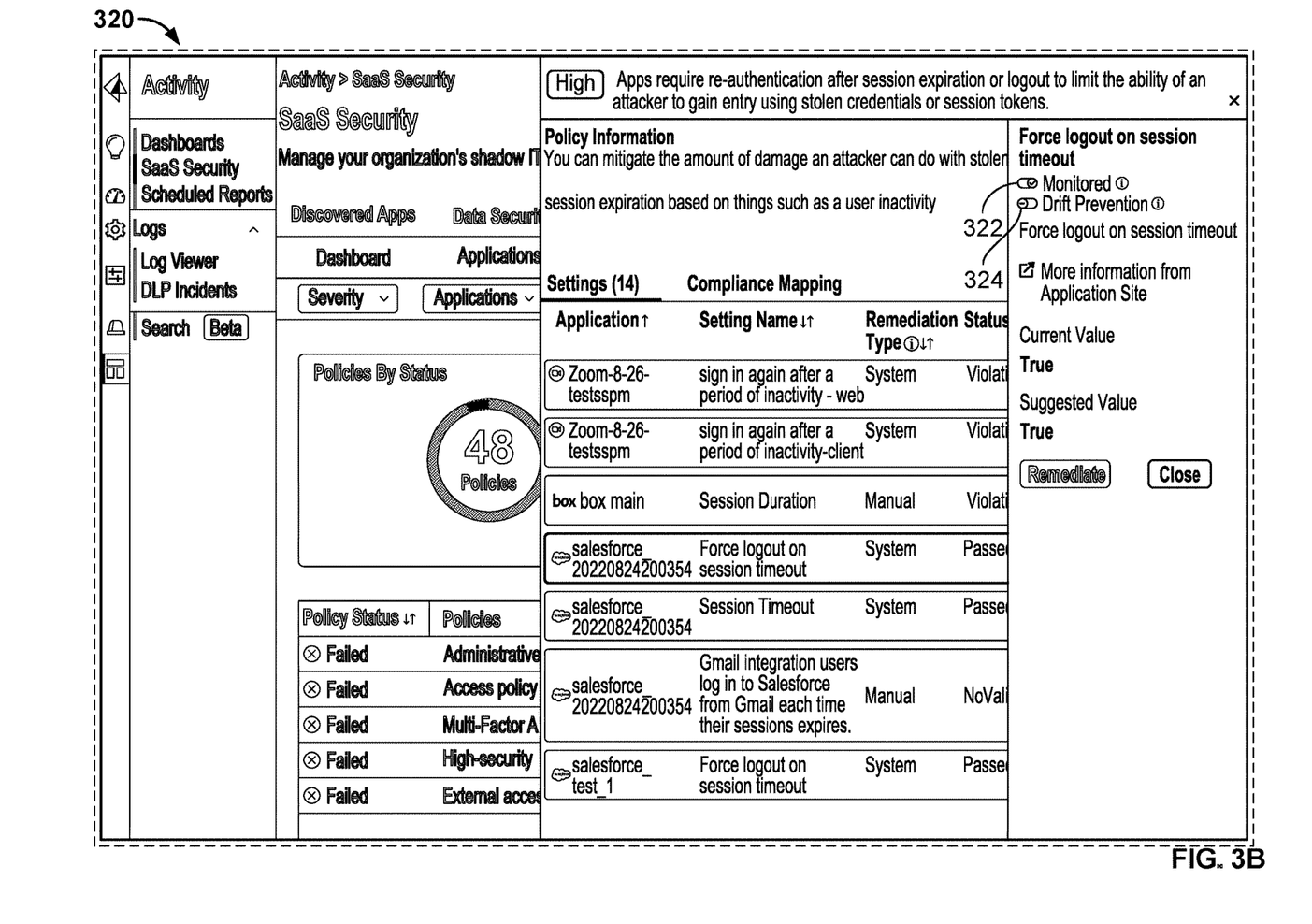
FIG. 3B is another example graphical user interface screen for the SaaS security service in accordance with some embodiments.

FIG. 3B is another example graphical user interface screen for the SaaS security service in accordance with some embodiments. As shown in the example graphical user interface of the SaaS security service at 320 includes various configurations including a toggle for monitoring these SaaS app security related settings as shown at 322. For example, the SSPM solution can generate an alert if another enterprise admin modifies any of these monitored SaaS app security related settings.

As also shown in the example graphical user interface of the SaaS security service at 320 includes various configurations including a toggle for performing drift prevention for these SaaS app security related settings as shown at 324. Drift prevention is another new feature of the disclosed SSPM solution that can prevent configuration drift. As such, drift prevention can lock a selected configuration setting to prevent other enterprise admin users from changing that security related configuration setting(s) for the SaaS apps for the enterprise.

Figure 4A:
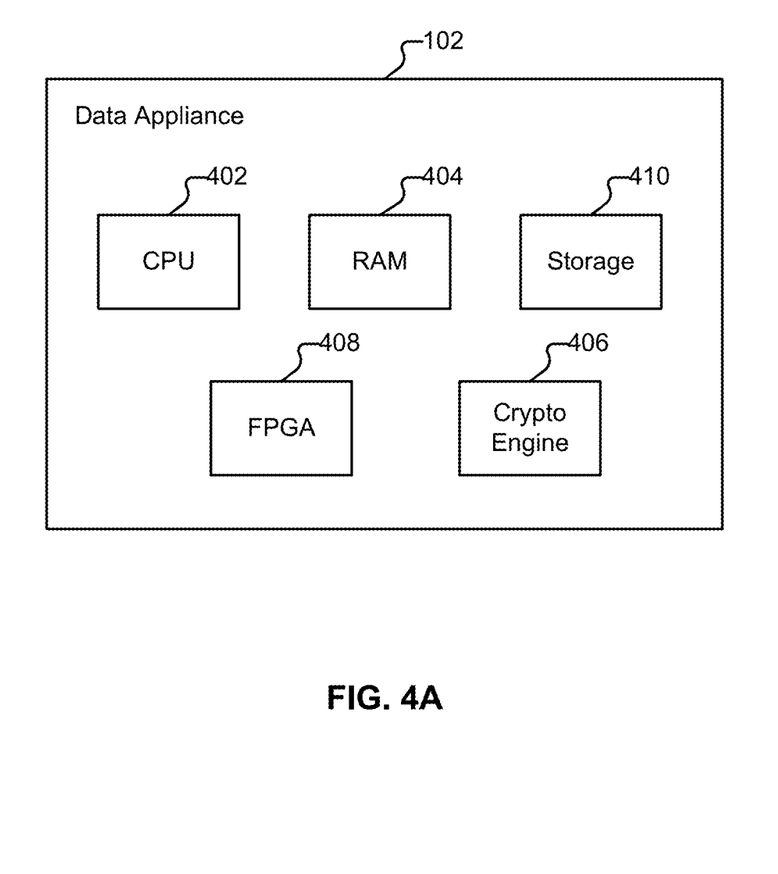
FIG. 4A illustrates an embodiment of a network gateway in accordance with some embodiments.

An embodiment of network gateway 102 is shown in FIG. 4A. The example shown is a representation of physical components that can be included in network gateway 102 if the network gateway is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information that can be used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing Social Networking; Web Browsing News; SSH; and so on.

The disclosed system processing architecture can be used with different types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA-5200 Series firewall appliances).

Figure 4B:
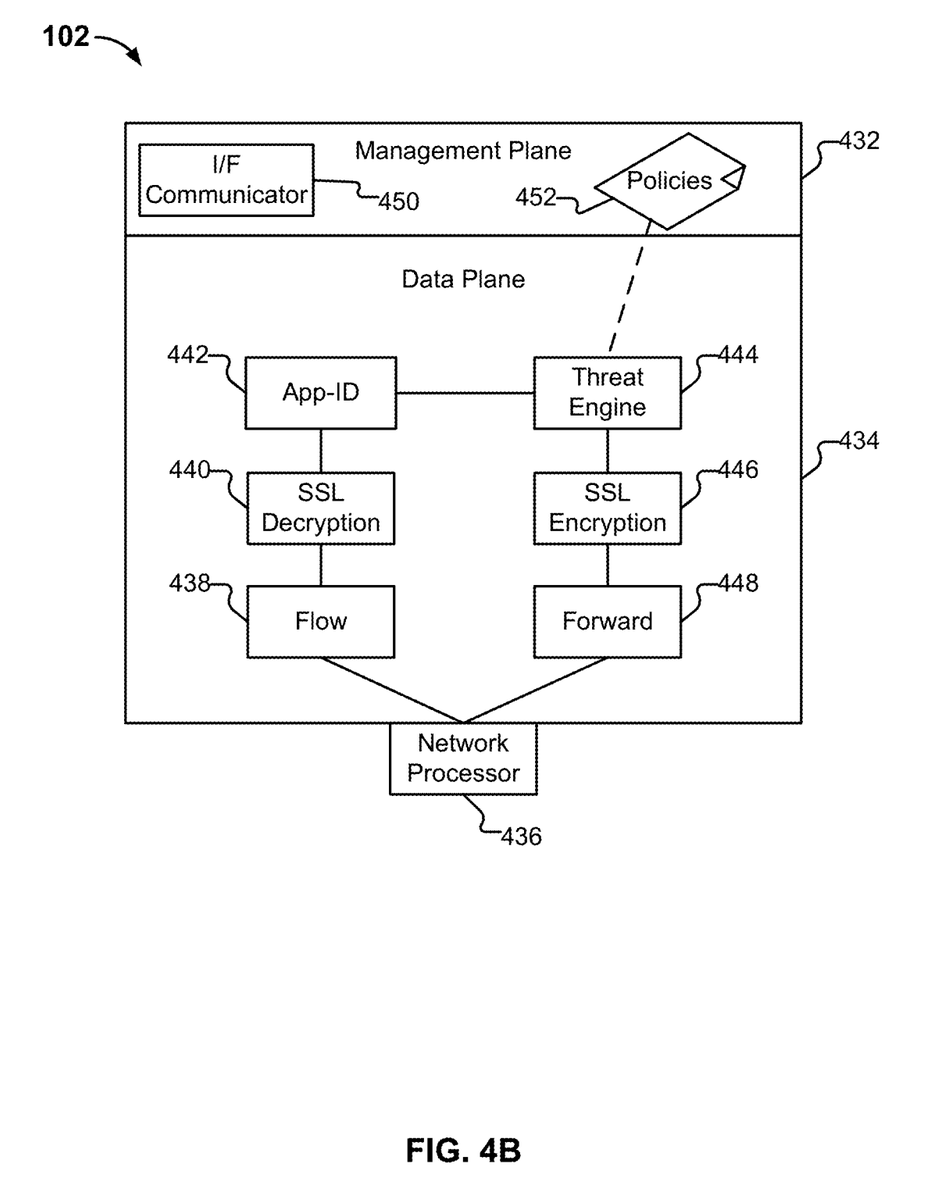
FIG. 4B is a functional diagram of logical components of an embodiment of a data appliance.

FIG. 4B is a functional diagram of logical components of an embodiment of a data appliance. The example shown is a representation of logical components that can be included in network gateway 102 in various embodiments. Unless otherwise specified, various logical components of network gateway 102 are generally implementable in a variety of ways, including as a set of one or more scripts (e.g., written in Java, python, etc., as applicable).

As shown, network gateway 102 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets from client devices and provide them to data plane 434 for processing. Whenever flow module 438 identifies packets as being part of a new session, it creates a new session flow. Subsequent packets will be identified as belonging to the session based on a flow lookup. If applicable, SSI, decryption is applied by SSL decryption engine 440. Otherwise, processing by SSI, decryption engine 440 is omitted. Decryption engine 440 can help network gateway 102 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network. Decryption can be controlled (e.g., enabled or disabled) selectively based on parameters such as: URI, category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., a web browsing session, the identified application can change, and such changes will be noted by network gateway 102. For example, a user may initially browse to a corporate Wiki (classified based on the URI, visited as "Web Browsing Productivity") and then subsequently browse to a social networking site (classified based on the URI, visited as "Web Browsing Social Networking"). Different types of protocols have corresponding decoders.

Based on the determination made by application identification engine 442, the packets are sent, by threat engine

444, to an appropriate decoder configured to assemble packets (which may be received out of order) into the correct order, perform tokenization, and extract out information. Threat engine 444 also performs signature matching to determine what should happen to the packet. As needed, SSI, encryption engine 446 can re-encrypt decrypted data. Packets are forwarded using a forward module 448 for transmission (e.g., to a destination).

As also shown in FIG. 4B, policies 452 are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 450 is provided for management communications (e.g., via (REST) APIs, messages, or network protocol communications or other communication mechanisms).

Additional logical components/features can be included in this example embodiment. For example, the network gateway components described above with respect to FIGS. 3A-B (e.g., location-based virtual gateways such as shown at 302A and 302B, RN Ingress Module 340, RN NAT Egress Module 350, MU NAT Egress Module 360, and/or Data Store 380, etc.) can also be included in the data appliance in various embodiments.

Various process embodiments for providing security controls across SaaS apps (e.g., for cloud-based security solutions) are disclosed as will now be described below.

Example Processes for Security Controls Across SaaS Apps

Figure 5:
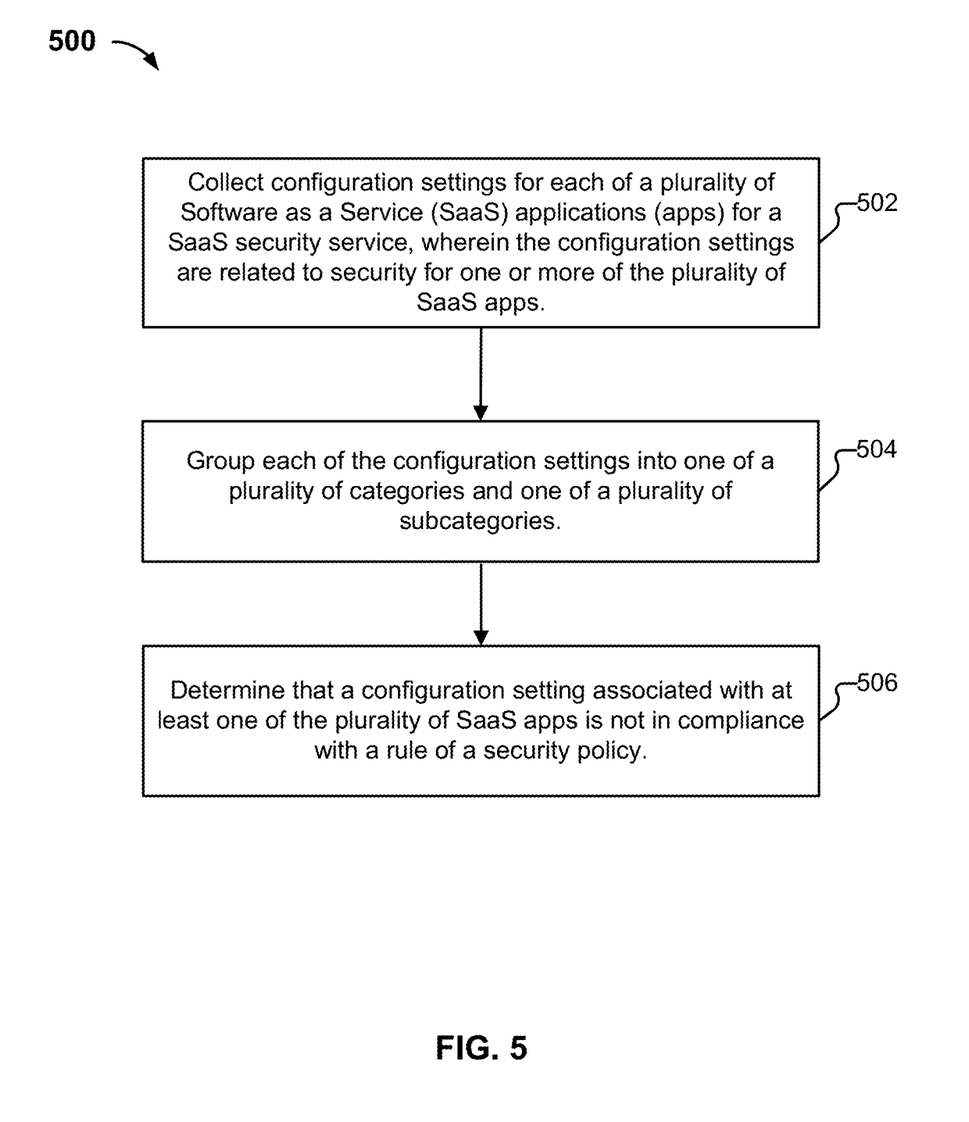
FIG. 5 is a flow diagram illustrating a process for providing security controls across SaaS apps in accordance with some embodiments.

FIG. 5 is a flow diagram illustrating a process for security controls across SaaS apps in accordance with some embodiments. In one embodiment, process 500 is performed using the system architectures described above (e.g., such as described above with respect to FIGS. 1-4B).

The process begins at 502 as collecting configuration settings for each of a plurality of Software as a Service (SaaS) applications (apps) for a SaaS security service is performed, wherein the configuration settings are related to security for one or more of the plurality of SaaS apps, such as similarly described above. For example, the plurality of SaaS apps can be associated with an enterprise customer of the SaaS security service.

At 504, grouping each of the configuration settings into one of a plurality of categories and one of a plurality of subcategories is performed, as also similarly described above. For example, the grouping of the configuration settings into one of the plurality of categories and one of the plurality of subcategories can be performed using the SaaS security service that can be implemented as a cloud-based security service.

At 506, determining that a configuration setting associated with at least one of the plurality of SaaS apps is not in compliance with a rule of a security policy is performed as similarly described above. For example, the rule can be associated with at least one of a plurality of rules of the security policy configured for security compliance for each of the plurality of subcategories.

Figure 6:
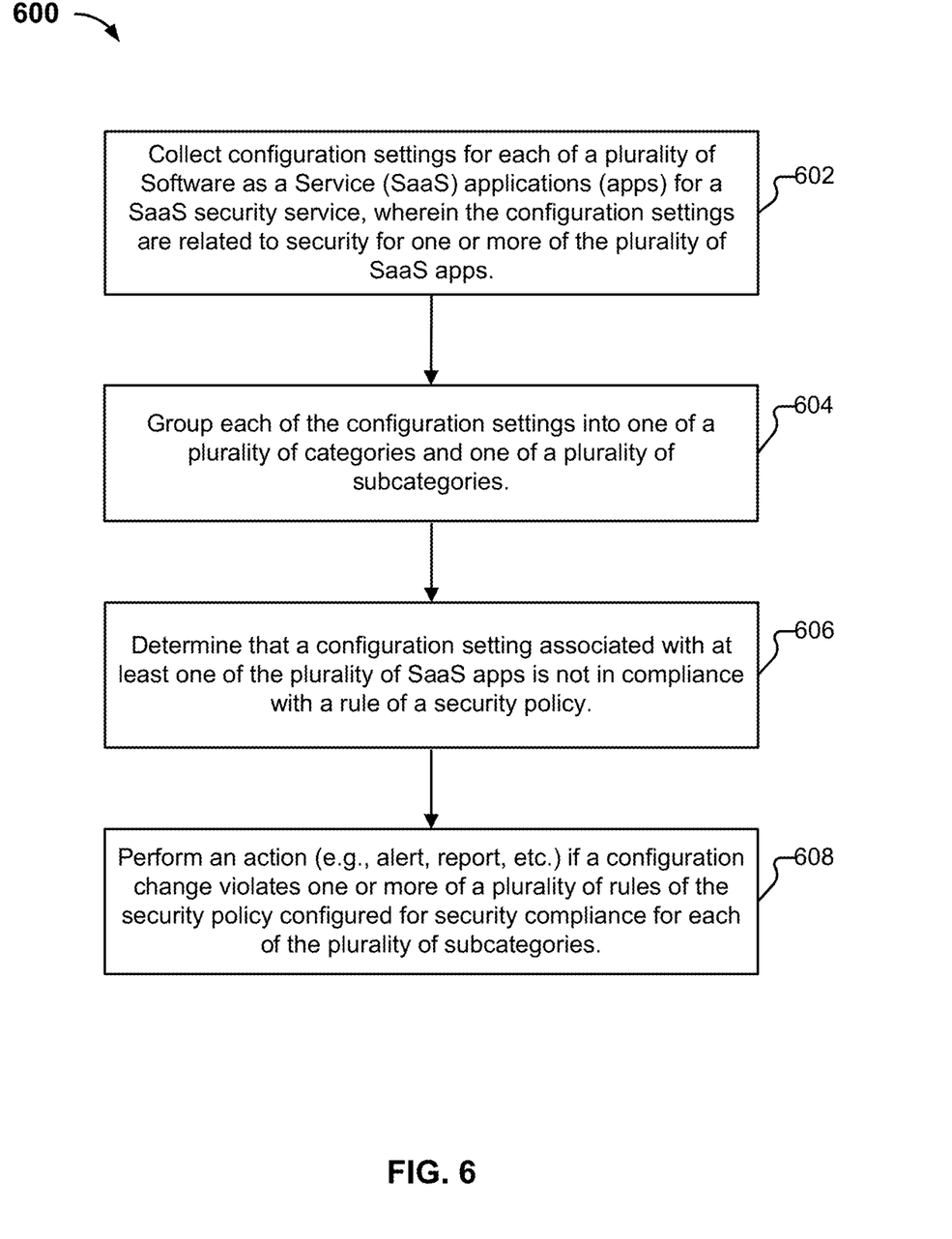
FIG. 6 is another flow diagram illustrating a process for providing security controls across SaaS apps in accordance with some embodiments.

FIG. 6 is another flow diagram illustrating a process for providing security controls across SaaS apps in accordance with some embodiments. In one embodiment, process 600 is performed using the system architectures described above (e.g., such as described above with respect to FIGS. 1-4B).

The process begins at 602 as collecting configuration settings for each of a plurality of Software as a Service (SaaS) applications (apps) for a SaaS security service is performed, wherein the configuration settings are related to security for one or more of the plurality of SaaS apps, such as similarly described above. For example, the plurality of SaaS apps can be associated with an enterprise customer of the SaaS security service.

At 604, grouping each of the configuration settings into one of a plurality of categories and one of a plurality of subcategories is performed, as also similarly described above. For example, the grouping of the configuration settings into one of the plurality of categories and one of the plurality of subcategories can be performed using the SaaS security service that can be implemented as a cloud-based security service. In one embodiment, a security platform (e.g., a network gateway/NFGW, virtual firewall, etc.) can be configured to the security policy, such as similarly described above.

At 606, determining that a configuration setting associated with at least one of the plurality of SaaS apps is not in compliance with a rule of a security policy is performed as similarly described above. For example, the rule can be associated with at least one of a plurality of rules of the security policy configured for security compliance for each of the plurality of subcategories. The SaaS security service can be configured to automatically analyze each of the configuration settings for each of the plurality of SaaS apps based on the plurality of rules of the security policy configured for security compliance for each of the plurality of subcategories as also similarly described above.

At 608, an action (e.g., alert, report, etc.) is performed by the SaaS security service if a configuration change violates one or more of a plurality of rules of the security policy configured for security compliance for each of the plurality of subcategories, such as similarly described above. For example, the SaaS security service can be configured to automatically analyze each of the configuration settings for each of the plurality of SaaS apps based on a plurality of rules of the security policy for an enterprise that is configured for security compliance for each of the plurality of subcategories. If a violation is detected based on the security policy for the enterprise, then the SaaS security service can generate an alert, report, or perform another action (e.g., to facilitate an InfoSec/IT/network/security admin for the enterprise to be informed of the configuration setting violation so that they can review it and determine whether to reconfigure that configuration setting or perform another responsive action, such as to enable the above-described drift protection to prevent other users from changing that configuration setting in the future).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
   a processor configured to:
      collect configuration settings for each of a plurality of Software as a Service (SaaS) applications (apps) for a SaaS security service, wherein the configuration settings are related to security for one or more of the plurality of SaaS apps;
      group each of the configuration settings into one of a plurality of categories and one of a plurality of subcategories, comprising to:
         categorize the configuration settings into the plurality of categories; and categorize a category of the plurality of categories into at least one subcategory of the plurality of subcategories, wherein the plurality of categories and the plurality of subcategories are mapped to a framework of categories and subcategories; and determine that a configuration setting associated with at least one of the plurality of SaaS apps is not in compliance with a rule of a security policy, wherein the rule is associated with at least one of a plurality of rules of the security policy configured for security compliance for each of the plurality of subcategories; and a memory coupled to the processor and configured to provide the processor with instructions.

2. The system recited in claim 1, wherein the plurality of SaaS apps are associated with an enterprise customer of the SaaS security service.

3. The system recited in claim 1, wherein the SaaS security service is implemented as a cloud-based security service.

4. The system recited in claim 1, wherein a security platform enforces the security policy.

5. The system recited in claim 1, wherein a security platform enforces the security policy, wherein the security platform comprises a network gateway.

6. The system recited in claim 1, wherein a network gateway enforces the security policy, and wherein the network gateway comprises a virtual firewall.

7. The system recited in claim 1, wherein the processor is further configured to:
automatically analyze each of the configuration settings for each of the plurality of SaaS apps based on a plurality of rules of the security policy configured for security compliance for each of the plurality of subcategories.

8. The system recited in claim 1, wherein the processor is further configured to:
generate an alert if a configuration change violates one or more of a plurality of rules of the security policy configured for security compliance for each of the plurality of subcategories.

9. The system recited in claim 1, wherein the processor is further configured to:
perform drift protection for the configuration settings that are related to security for one or more of the plurality of SaaS apps based on a plurality of rules of the security policy configured for security compliance for each of the plurality of subcategories.

10. A method, comprising:
collecting configuration settings for each of a plurality of Software as a Service (Saas) applications (apps) for a SaaS security service, wherein the configuration settings are related to security for one or more of the plurality of SaaS apps;
grouping each of the configuration settings into one of a plurality of categories and one of a plurality of subcategories, comprising:
categorizing the configuration settings into the plurality of categories; and
categorizing a category of the plurality of categories into at least one subcategory of the plurality of subcategories, wherein the plurality of categories and the plurality of subcategories are mapped to a framework of categories and subcategories; and
determining that a configuration setting associated with at least one of the plurality of SaaS apps is not in compliance with a rule of a security policy-policy, wherein the rule is associated with at least one of a plurality of rules of the security policy configured for security compliance for each of the plurality of subcategories.

11. The method of claim 10, wherein the SaaS security service is implemented as a cloud-based security service.

12. The method of claim 10, wherein a security platform enforces the security policy.

13. The method of claim 10, wherein a network gateway enforces the security policy, and wherein the network gateway comprises a virtual firewall.

14. A computer program product, the computer program product being embodied in a tangible non-transitory computer readable storage medium and comprising computer instructions for:
collecting configuration settings for each of a plurality of Software as a Service (Saas) applications (apps) for a SaaS security service, wherein the configuration settings are related to security for one or more of the plurality of SaaS apps;
grouping each of the configuration settings into one of a plurality of categories and one of a plurality of subcategories, comprising:
categorizing the configuration settings into the plurality of categories; and
categorizing a category of the plurality of categories into at least one subcategory of the plurality of subcategories, wherein the plurality of categories and the plurality of subcategories are mapped to a framework of categories and subcategories; and
determining that a configuration setting associated with at least one of the plurality of SaaS apps is not in compliance with a rule of a security policy, wherein the rule is associated with at least one of a plurality of rules of the security policy configured for security compliance for each of the plurality of subcategories.

15. The computer program product recited in claim 14, wherein the SaaS security service is implemented as a cloud-based security service.

16. The computer program product recited in claim 14, wherein a security platform enforces the security policy.

17. The computer program product recited in claim 14, wherein a network gateway enforces the security policy, and wherein the network gateway comprises a virtual firewall.

* * * * *